United States Patent
Kawaguchi

(10) Patent No.: US 7,243,257 B2
(45) Date of Patent: Jul. 10, 2007

(54) COMPUTER SYSTEM FOR PREVENTING INTER-NODE FAULT PROPAGATION

(75) Inventor: Shinichi Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 10/429,682

(22) Filed: May 6, 2003

(65) Prior Publication Data

US 2004/0078649 A1    Apr. 22, 2004

(30) Foreign Application Priority Data

May 14, 2002   (JP)   ............................. 2002-138619

(51) Int. Cl.
   *G06F 11/00*   (2006.01)
(52) U.S. Cl. ................. 714/8; 714/4; 714/55
(58) Field of Classification Search .............. 714/9, 714/27
   See application file for complete search history.

(56) References Cited

U.S. PATENT DOCUMENTS

| | | | | |
|---|---|---|---|---|
| 4,875,037 | A * | 10/1989 | Escolar ................. | 340/825.01 |
| 4,907,232 | A * | 3/1990 | Harper et al. ................. | 714/3 |
| 5,036,455 | A * | 7/1991 | Atwood ..................... | 714/22 |
| 5,058,056 | A * | 10/1991 | Hammer et al. ............... | 714/4 |
| 5,269,016 | A * | 12/1993 | Butler et al. ................... | 714/6 |
| 5,473,752 | A * | 12/1995 | Beistle et al. .................. | 714/4 |
| 5,548,743 | A | 8/1996 | Sugiyama et al. | |
| 5,765,034 | A | 6/1998 | Recio | |
| 5,845,071 | A | 12/1998 | Patrick et al. | |
| 5,909,540 | A * | 6/1999 | Carter et al. ..................... | 714/4 |
| 6,061,750 | A | 5/2000 | Beardsley et al. ............. | 710/74 |
| 6,243,814 | B1 * | 6/2001 | Matena .......................... | 726/3 |
| 6,502,203 | B2 * | 12/2002 | Barron et al. .................. | 714/4 |
| 6,542,476 | B1 * | 4/2003 | Elizondo et al. ............ | 370/278 |
| 6,574,753 | B1 * | 6/2003 | Haynes et al. ................. | 714/43 |
| 6,581,166 | B1 * | 6/2003 | Hirst et al. ..................... | 714/4 |
| 6,675,315 | B1 * | 1/2004 | Semler et al. ................. | 714/4 |
| 6,691,244 | B1 * | 2/2004 | Kampe et al. ................. | 714/4 |
| 6,725,396 | B2 * | 4/2004 | Ahrens et al. ................ | 714/10 |
| 6,766,470 | B1 * | 7/2004 | Shah ............................. | 714/9 |
| 6,802,020 | B1 * | 10/2004 | Smith ............................ | 714/4 |
| 6,918,051 | B2 * | 7/2005 | Block et al. .................... | 714/4 |
| 6,928,583 | B2 * | 8/2005 | Griffin et al. ................. | 714/11 |

(Continued)

FOREIGN PATENT DOCUMENTS

EP    0 380 093    8/1990

(Continued)

OTHER PUBLICATIONS

Microsoft Computer Dictionary, Fifth Edition; Microsoft Press; 2002; p. 354.*

(Continued)

*Primary Examiner*—Scott Baderman
*Assistant Examiner*—Joshua Lohn
(74) *Attorney, Agent, or Firm*—McGinn IP Law Group, PLLC

(57) ABSTRACT

In a computer system in which computers each having a plurality of processors are connected with each other, said each computer comprises a system controller for, at the time of a failure within the computer system body, disconnecting own computer from other computer in which said failure has occurred, without informing own processor of such failure.

17 Claims, 6 Drawing Sheets

U.S. PATENT DOCUMENTS

| | | | |
|---|---|---|---|
| 7,036,042 B1 * | 4/2006 | Nguyen | 714/7 |
| 2004/0088523 A1 * | 5/2004 | Kessler et al. | 712/29 |

FOREIGN PATENT DOCUMENTS

| | | |
|---|---|---|
| JP | 55-043682 | 3/1980 |
| JP | 63-003361 | 1/1988 |
| JP | 63-3361 | 1/1988 |
| JP | 63-282865 | 11/1988 |
| JP | 64-068858 | 3/1989 |
| JP | 08-137815 | 5/1996 |
| JP | 2001-7893 | 1/2001 |
| JP | 2001-007893 | 1/2001 |

OTHER PUBLICATIONS

Japanese Office Action dated Dec. 21, 2004 with Partial English Translation.
European Search Report dated Sep. 27, 2005.
Japanese Office Action dated Aug. 22, 2005, with partial English translation.

* cited by examiner

COMPUTER SYSTEM FOR PREVENTING INTER-NODE FAULT PROPAGATION

BACKGROUNDS OF THE INVENTION

1. Field of the Invention

The present invention relates to a computer system, and more particularly to a computer system capable of preventing a failure occurring in one of the computers constituting the computer system from propagating to the rest of the computers.

2. Description of the Related Art

A typical conventional computer system featuring capabilities to prevent a failure occurring in one of the computers constituting the computer system from propagating to the rest of the computers, achieves these capabilities as follows.

FIG. 5 is a block diagram showing a typical configuration of a conventional computer system. In the computer system shown in the diagram, a plurality of computers 100, 200 are connected with each other through a network 500, and operate in coordination with each other as a cluster system.

As shown in FIG. 5, computers 100, 200 constituting this type of computer system are referred to as "nodes."

Nodes 100, 200 each includes a plurality of CPUs 101 to 10$n$; a system controller 111 that is connected to each of the CPUs 101 to 10$n$; a main memory 112 for containing information concerning the operation of the system controller 111 and so forth; an IO controller 114 for controlling the input and output of the information processed by the system controller 111; a network adapter 115 for connecting the node bodies 100, 200 and the network 500 electrically; an IO bus 113 for connecting the system controller 111, the IO controller 114, and the network adapter 115 with one another; and an inter-node connection bus 116 for connecting the node bodies 100, 200 and the network 500 physically.

For this type of computer system, operational continuity is ensured by improving fault tolerance through increased system redundancy or by improving system performance through parallel job execution by two or more nodes 100, 200, so that the entire system will not be down even when one of its nodes fails.

In such a cluster system, jobs executed by the individual nodes 100, 200 are started as different processes independent of each other. By this, when a failure occurs in one of the nodes, the failing node can be isolated from other nodes; the job being executed by the failing node can then be re-executed or resumed by a good node, thereby improving the availability of the system.

In a typical conventional cluster system, the communications channel between nodes 100, 200 consists of a communication network 500, notably Ethernet (R) or a fiber channel.

In recent years, a new type of cluster system has appeared. As shown in FIG. 6, this type of cluster system has a plurality of processors. It can achieve an ultra-high speed inter-node communications by logically dividing a medium- or large-scale distributed shared memory system into units of distributed memories and by using remote memory access for inter-node communications. The internal configuration of each node of this cluster system is similar to that of the individual nodes 100, 200 shown in FIG. 5, except that the former node uses a cross-bar switch 500' instead of a network 500.

When used as a single computer, the distributed shared memory system shown in FIG. 6 uses all the memory spaces formed by local and remote memories as a single own memory space. In cluster operation mode, on the other hand, only local memories of processor groups are used as an own memory; in this case, access to a remote memory is used as an inter-node access from one node to another.

When using this mode of operation, a cluster system with extremely highly efficient inter-node access paths can be provided, because inter-node access can attain a performance level similar to that of a remote memory in a single distributed shared system, in terms of both access time and throughput.

However, a cluster system based on the conventional art, in which a distributed shared system is divided logically, may from time to time fail to realize fully the potential high availability of the cluster system as described above. This is because the nodes in such a cluster system are connected very densely with each other; in such a dense node connection, an uncorrectable failure that has occurred between nodes during data transfer may propagate in its entirety to other nodes, possibly leading to a failure in many or all of the nodes in the system.

In Japanese Patent Laying-Open (Kokai) No. 2001-7893, an art to resolve the problem of a failure propagating between nodes in a cluster system using a logically divided distributed shared system is described. This art features an enhanced ECC (Error-Correcting-Code) circuit used in the system controlling part, which is provided with a capability to replace a send data to another node with "0" fixed value+ECC during 2-bit error detection in addition to a function for 1-bit error detection, 1-bit error correction, and 2-bit error detection. This art also ensures that the sum adding function of the cluster driver will always calculate a sum for data check, write the resulting sum into the shared memory of the own node, and add the sum to the send data to another node. Finally, the sum check function of this art is designed to always check the sum for data check contained in the receive data that has been read from the shared memory of the other node.

In the art described above, a remote memory read used for data transfer between the nodes in the cluster is executed by a cluster driver program running on the target node, which issues on the processor located in the own node a LOAD instruction from the memory space of the source node.

In a commonly used processor, following the execution of a load instruction by the program, timer-based monitoring is conducted from when the resulting data read is output to outside the processor as a read request until the target data is returned to the processor. If for some reasons no replay data has been returned in response to the executed load instruction and the timer detects a timeout condition, this may develop into an OS panic or other serious situation, preventing further operation of the entire system.

Otherwise, if the processor does not perform timeout detection, the non-returning of reply data may possibly cause the operation of the processor to stall.

Therefore, even with the art described in the disclosure above, high availability may sometimes not be achieved because if during an inter-node access a remote memory read from the memory of the target node is not responded by a reply data for the read due to a failure encountered on the target node or somewhere along the channel connecting between the two nodes, the source node issuing the read can also be affected by the failure.

In the worst-case scenario, in which all but one node are executing remote memory reads from the memory of the one node and if the one node cannot return the read reply data because of a failure, then this may develop into a complete system down.

For this reason, a cluster system according to this art often cannot achieve the high availability that it was originally designed to achieve.

In Japanese Patent Laying-Open (Kokai) No. Heisei 8-137815, a computer system is described that is designed to prevent the occurrence of a failure while processing a message. In this computer system, the requesting module is provided with a sending part for sending a Synchronize message to the target module if a response to the message it has sent out should time out; a part for discarding a response message to a previous message that has been received before a Synchronization Completed message is received; a synchronization completing processing part for performing the process to complete synchronization upon receiving a Synchronization Completed message. The target module in this computer system is provided with a replying part for replying the requesting module with a Synchronization Completed message upon receiving a Synchronize message.

However, all the parts described above are provided within the processor, as shown in FIG. 2, and several problems attributable to this configuration have been reported. For example, when a Synchronization Completed message arrived during an operation system's startup procedure on the processor, a trouble occurred in the operation system, hampering the processing by the operating system.

SUMMARY OF THE INVENTION

The object of the present invention is to realize continued operation by good nodes, even when the problems mentioned herein occur, without causing a node down event due to the processor's detection of a timeout condition or otherwise making the processor stall.

More specifically, the object of the present invention is, during data transfer from a source node to a target node on a cluster system in which inter-node communications are performed through distributed shared memory access, to prevent a failure, which has occurred in the target node or somewhere along the channel connecting between the two nodes, from propagating to the node requesting the data transfer even if there is no response to the data transfer request.

According to one aspect of the invention, a computer system in which computers, each having a plurality of processors, are connected with each other, comprises providing the each computer with a system controller for, at the time of a failure within the computer system body, disconnecting own computer from other computer in which the failure has occurred, without informing own processor of such failure.

In the preferred construction, the system controller is placed subordinate to the each computer.

In another preferred construction, the each computer comprises main memory accessible by the plurality of processors.

In another preferred construction, the system controller is placed subordinate to the each computer, the each computer comprises main memory accessible by the plurality of processors.

In another preferred construction, the each computer comprises cluster driver for transferring data to be received/transmitted between the own processor and the processors of the other computer.

In another preferred construction, the system controller is placed subordinate to the each computer, the each computer comprises cluster driver for transferring data to be received/transmitted between the own processor and the processors of the other computer.

In another preferred construction, the system controller is placed subordinate to the each computer, the each computer comprises main memory accessible from the plurality of processors, and cluster driver for transferring data to be received/transmitted between the own processor and a processor of the other computer.

In another preferred construction, the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller is placed subordinate to the each computer, the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the each computer comprises main memory accessible by the plurality of processors, and the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller is placed subordinate to the each computer, the each computer comprises cluster driver for transferring data to be received/transmitted between the own processor and a processor of the other computer, and the system controller further comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller is placed subordinate to the each computer, the each computer comprises main memory accessible by the plurality of processors, and the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller is placed subordinate to the each computer, the each computer comprises cluster driver for transferring data to be received/transmitted between the own processor and a processor of the other computer, and the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller is placed subordinate to the each computer, the each computer comprises main memory accessible from the plurality of processors, and cluster driver for transferring data to be received/transmitted between the own processor and a processor of the other computer, and the system controller comprises means for transmitting a signal to the other computer if there is no reply from such other computer to data that the own processor has transferred to a processor of such other computer, and means for disconnecting the own processor from the other computer if there is no reply to the signal within a pre-specified period of time.

In another preferred construction, the system controller comprises timer for measuring the specified period of time.

Yet more specifically, the present invention realizes this object by performing a data transfer between computers (nodes) using cluster drivers operating on the respective nodes, and, if a failure has occurred in the source node or somewhere along the data transfer channel and in consequence a reply has not been returned in response to the remote read, having a system controller (read failure detection circuit) in a system controller located on the target node generate a certain fixed value and return it to the own processor of the target node so that the own processor will not detect the failure.

Since few general-purpose processors and operating systems in open systems incorporate capabilities for high availability as described above, the present invention provides a general-purpose processor and an operating system with high availability capabilities by modifying the configuration of the system body as described above.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The embodiments of the present invention will now be described in detail with reference to the drawings.

(Embodiment 1)

[Description of Configuration]

Figure 1:
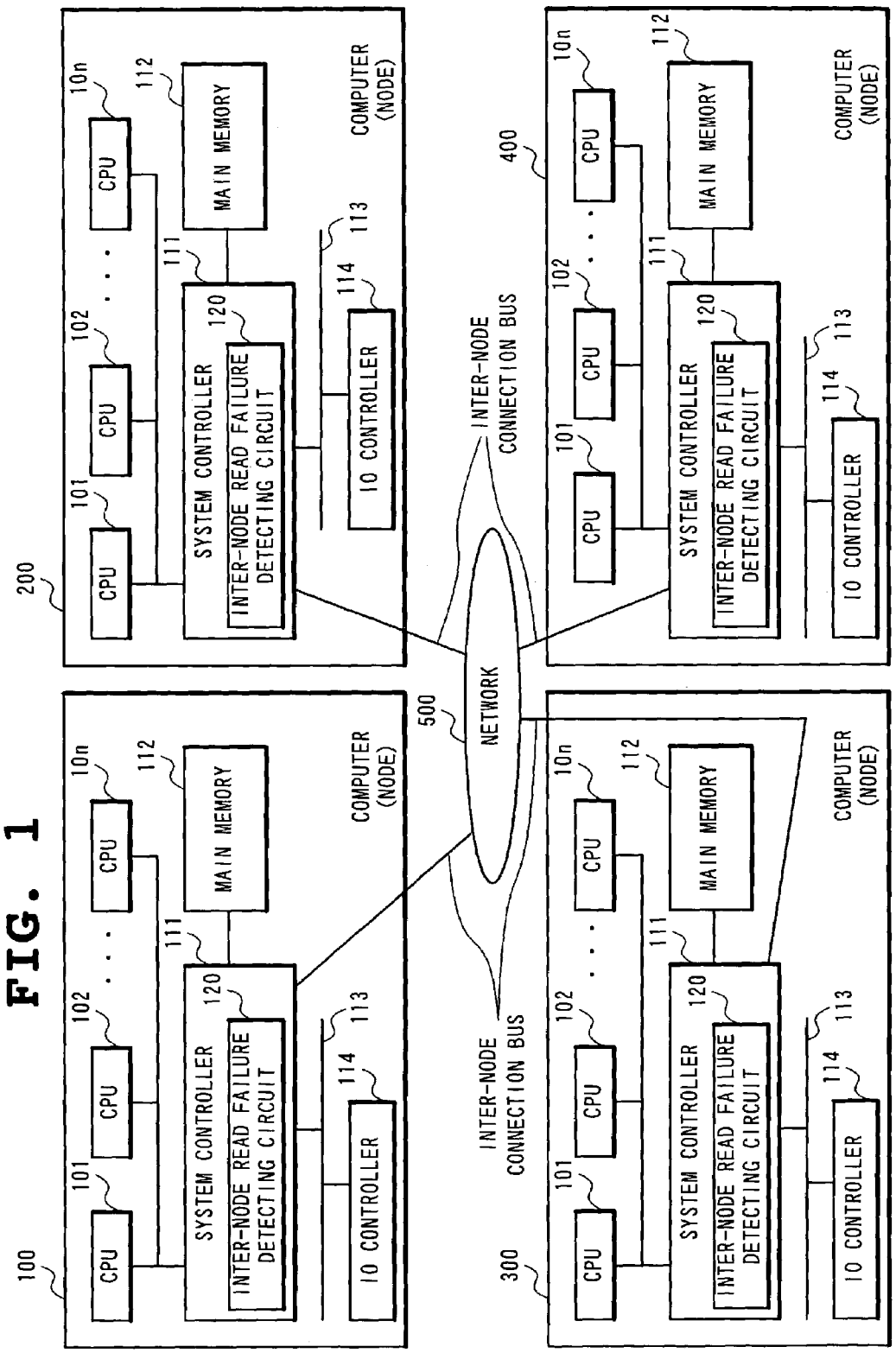
FIG. 1 is a block diagram showing a typical configuration of a computer system according to the first embodiment of the present invention.

FIG. 1 is a block diagram showing a typical configuration of a computer system according to the first embodiment of the present invention. In the cluster system shown in FIG. 1, a plurality of computers 100 to 400 are connected with each other through a network 500, and the plurality of computers 100 to 400 operate in coordination with each other as a cluster system. A cross-bar switch may be used as the network 500.

As shown in FIG. 1, computers 100 to 400 constituting a cluster system are referred to as "nodes."

The computers 100 to 400 in FIG. 1 each has a plurality of CPUs 101 to 10n, a main memory 112, an IO controller 114, and a network adapter 115. In the center of these nodes, a system controller 111 is located to control the operation of the node bodies.

The system controller 111 performs such tasks as data transfer control between each of the CPUs 101 to 10n, the main memory 112, and the IO controller 115, and coherency control within the nodes 100 and 200. The system controller 111 has an implementation of an inter-node read failure detection circuit 120.

The system controller 111, the IO controller 114, and the network adapter 115 are connected with one another via an IO bus 113.

Figure 2:
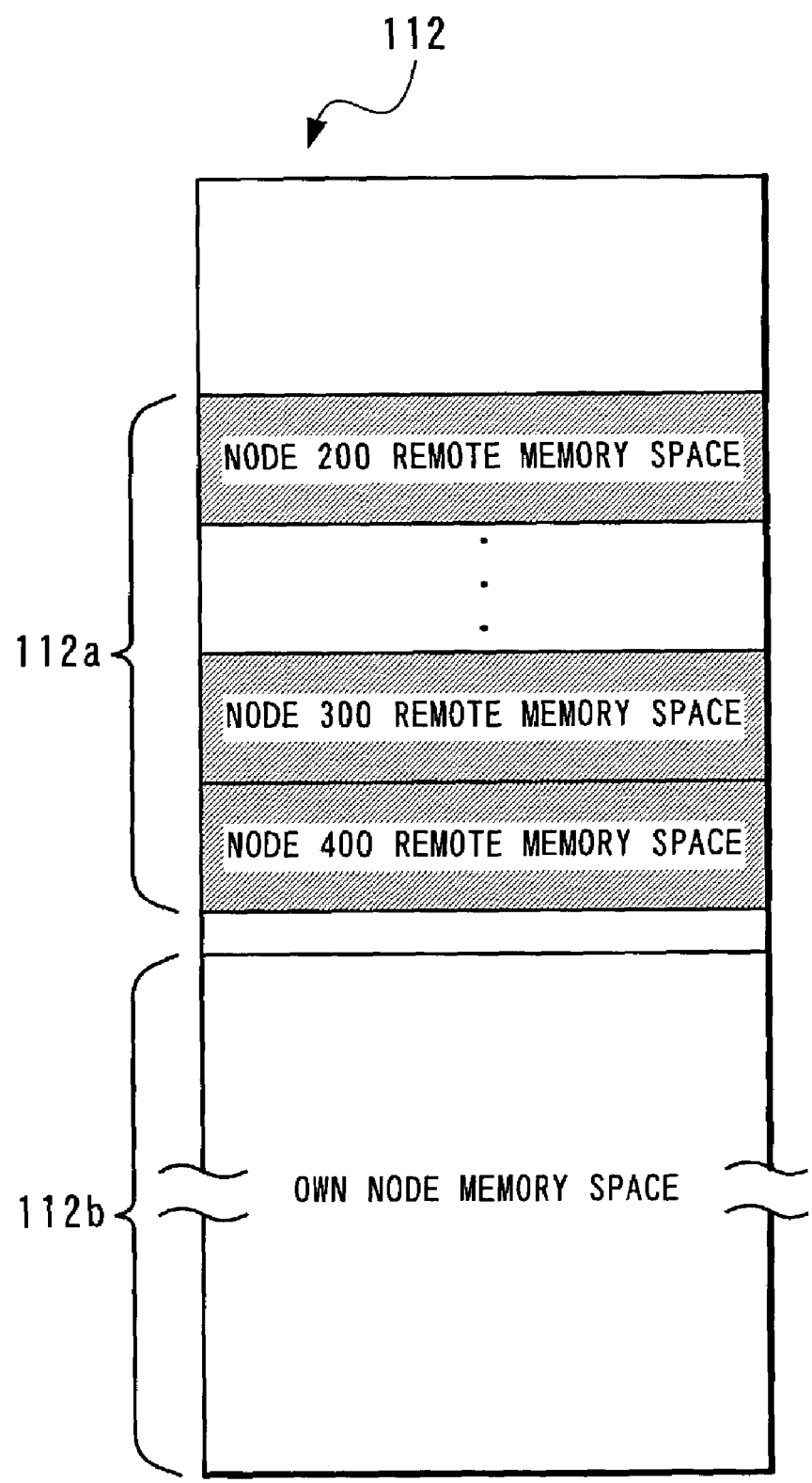
FIG. 2 is a typical internal structural diagram for the address spaces in the main memory 112 in the individual node 100 shown in FIG. 1.

FIG. 2 is a typical internal structural diagram for the address spaces in the main memory 112 in the individual node 100 shown in FIG. 1. FIG. 2 shows the address spaces in the remote memory space 112a of the own main memory 112 of the node 100 in FIG. 1, mapped with the address spaces in the main memories 112 of the nodes 200 to 400.

The software operating on the processors of the node 100 can read the contents of the main memories 112 of the other nodes 200 to 400 by executing a load from the address spaces in the main memories 112 of the other nodes 200 to 400 that have been mapped in the remote memory space 112a of the node 100. The address spaces in the main memories 112 of the nodes 200 to 400 are structured similarly to the structure shown in FIG. 2.

Figure 3:
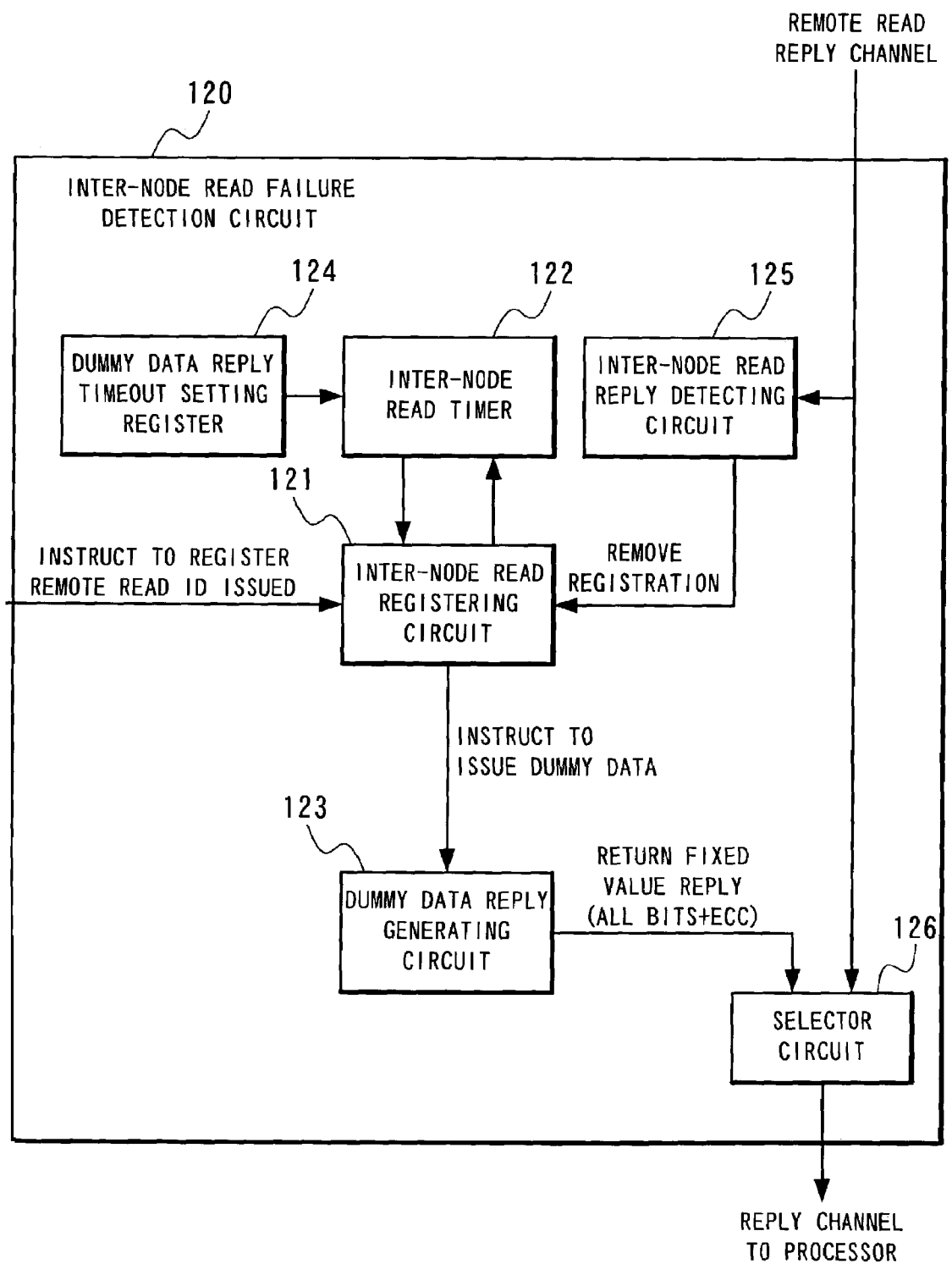
FIG. 3 is a block diagram showing a typical internal configuration of the inter-node read failure detection circuit 120 of the node 100 shown in FIG. 1.

FIG. 3 is a block diagram showing a typical internal configuration of the inter-node read failure detection circuit 120 of the node 100 shown in FIG. 1. The inter-node read failure detection circuit 120 includes an inter-node read registering circuit 121 for registering the ID of an inter-node read issued by the system controller 111 for any of the nodes 200 to 400; an inter-node read timer 122 for measuring the elapse of a pre-specified period of time from when an inter-node read is issued; a dummy data reply generating circuit 123 for, after a timeout condition upon the elapse of the pre-determined period of time, generating a pre-defined fixed value for the CPU issuing an inter-node read for use as a temporary reply to the read (dummy data), the fixed value being "all bits set to '1'" in the case of a code other than an ECC code and a corresponding value in the case of an ECC code; a dummy reply timeout setting register 124 for registering the time elapsed before the dummy data reply is returned; an inter-node reply detection circuit 125 for detecting that a read reply data has been returned successfully from any of the nodes 200 to 400 and instructing the inter-node read registering circuit 121 to remove the registration; and a selector circuit 126 for outputting selectively, either the read reply data from any of the nodes 200 to 400 or the above-described dummy reply data, to the CPU issuing the inter-node read.

[Description of Operation]

The operation of the cluster system in FIG. 1 will now be described.

When data transfer is performed between two of the individual nodes 100 to 400 in FIG. 1, the process (the software) operating on one of the CPUs 101 to 10n of these nodes 100 to 400 works with another on any of the CPUs 101 to 10n operating on other nodes 100 to 400, through a special cluster driver for each node 100 to 400.

When a cluster driver performs data transfer between two of the nodes 100 to 400 based on an instruction from a user process, it issues a load instruction from one of the address spaces for the source node that have been mapped into the address spaces in the main memory 112 of the own nodes. To invoke hardware operation in response to the load instruction, a read transaction for such address is issued by the processor to the system controller 111. The system controller 111 then uses that address to issue, via the network 500, a remote read from one of the nodes 100 to 400.

Receiving the remote read, the system controller 111 of the target node reads data from the main memory 112 of the own node, and returns the read reply to the node issuing the remote read, via the network 500.

The operation of the inter-node read failure detection circuit 120 of the system controller 111 will now be described. As an example, the case where the node 200 performs a remote read from an address space in the main memory 112 of the node 100 will be explained. The system controller 111 of the node 200 first assigns the remote read a unique ID and includes it in a remote read packet, and then outputs an inter-node remote read transaction to the inter-node connection bus 116.

When an inter-node remote read is issued, its ID is registered with the inter-node read registering circuit 121 of the inter-node read failure detection circuit 120.

More than one inter-node remote read can be issued at a time.

Upon registration of an inter-node read ID, the inter-node read failure detection circuit 120 begins to measure time for this ID, using an inter-node read timer. Receiving an inter-node remote read, the node 100 reads data from the memory space 112b of the own node. It then adds the same ID that was included in the remote read to a reply data packet, and issues the reply data to the node 200.

If a reply data to the inter-node read it has issued is returned from the node 100 before the time set in the dummy reply timeout setting register 124 elapses from when the inter-node read failure detection circuit 120 began to measure time, the node 200 will remove the ID registered in the inter-node read registering circuit 121 for inclusion in the reply data, terminate the timer measurement, and return the reply data to the processor through the selector circuit 126.

If a reply data to the inter-node read it has issued is not returned from the node 100 before the time set in the dummy reply timeout setting register 124 elapses from when the inter-node read failure detection circuit 120 began to measure time, the node 200 will remove the ID registered in the inter-node read registering circuit 121 for inclusion in the reply data, terminate the timer measurement, have the dummy data reply generating circuit 123 generate a certain fixed value (e.g., all bits set to "1") for a reply data, and return the reply data to the processor through the selector circuit 126.

Next, the normal inter-node access operation of the cluster system in FIG. 1 will be described, followed by the description of the operation of the same cluster system when a failure occurs on the target node and in consequence a reply to a read cannot be returned.

The descriptions below show the procedure of inter-node data transfer using remote read from the node 100 to the node 200, according to a time series.

In the initial state, the value of the status flag (FLG) for the node 100 is 0×00. In a way of example, the numbers following 0× are represented as hexadecimals.

(1) The cluster driver of the node 100 copies the data for transfer onto the remote memory space 112a, which has been defined in the main memory 112 of the node 100 and which is accessible by the node 200.

(2) After completing copying the data for transfer onto the remote memory space 112a of the node 100, the node 100 writes a value (0×01), representing remote readability, onto a status flag (FLG) in the remote memory space 112a for representing the completion or non-completion of the copying process.

(3) The cluster driver of the node 200 has been continuing a remote read (which is commonly referred to as "polling") from the status flag (FLG), which indicates the copying status of the data for transfer onto the remote memory space 112a being performed by the cluster driver of the node 100.

(4) If the value of the status flag (FLG) for the node 100 is identical to the value defined as "copying," then the cluster driver of the node 200 further continues the remote read.

(5) If the value of the status flag (FLG) for the node 100 is identical to the value defined as "remote readable" (0×01), then the cluster driver of the node 200 performs a remote read on the data for transfer contained in the remote memory space 112a of the node 100, and writes all the data for transfer onto the remote memory space 112a of the node 200.

(6) Upon completing data transfer by remote read from the node 100, the cluster driver of the node 200 performs a remote-read from the status flag (FLG) for the node 100 again.

(7) If the value of the status flag (FLG) that has been remote-read by the cluster driver of the node 100 is identical to the value that was referred to in (5) as being defined as "remote readable" (0×01), then the cluster driver of the node 200 determines that the transfer has completed successfully and terminates the transfer process.

Next, the operation that will take place during inter-node data transfer as described above if a failure occurs on the node 100, i.e., the source node for data transfer, or somewhere along the channel for data transfer and in consequence a reply data to a remote read cannot be returned will be described, according to a time series.

(1) The cluster driver of the node 100 copies the data for transfer onto the remote memory space 112a, which has been defined in the main memory 112 of the node 100 and which is accessible by the node 200.

(2) After completing copying the data for transfer onto the remote memory space 112a of the own node, the node 100 writes a value (0×01), representing remote readability, onto a status flag (FLG) in the remote memory space 112a for representing the completion or non-completion of the copying process.

(3) The cluster driver of the node 200 has been performing a remote read (which is commonly referred to as "polling") from the status flag (FLG), which indicates the copying status of the data for transfer onto the remote memory space 112*a* being performed by the cluster driver of the node 100.

(4) If the value of the status flag (FLG) for the node 100 is identical to the value defined as "copying" (0×00), then the cluster driver of the node 200 further continues the remote read.

(5) If the value of the status flag (FLG) for the node 100 is identical to the value defined as "remote readable" (0×01), then the cluster driver of the node 200 performs a remote read on the data for transfer contained in the remote memory space 112*a* of the node 100 and begins writing the data returned in response to the remote read onto the remote memory space 112*a* of the node 200.

(6) If the node 100 goes down due to a failure that has occurred in the own node, it becomes impossible to perform a data reply to the remote read sent from the node 200.

(7) Once falling in this state, the node 100 cannot return a reply to any remote read that it may receive thereafter.

(8) Since no reply is returned in response to the remote read that it has issued to the node 100, the node 200 detects a timeout condition through the inter-node read timer 122 provided in the inter-node read failure detection circuit 120 of the system controller 111 of the own node. A certain fixed value (with all bits set to "1" and an ECC code that does not entail error detection) is returned to the processor of the node 200.

(9) The cluster driver of the node 200 does not detect a failure at this point in time; instead, it writes the fixed value above received from the processor onto its own remote memory space 112*a*, and thereafter repeats the cycle of a remote read from the node 100 and a write to the local memory.

(10) The cluster driver of the node 200 performs remote reads for all the data for transfer from the node 100.

(11) The cluster driver of the node 200 issues a remote read from the status flag (FLG) for the node 100.

(12) The node 100 can neither reply nor return in response to any remote read from the status flag (FLG) described above.

(13) Similarly to (8), since no reply is returned in response to the remote read that it has issued to the node 100, the node 200 detects a timeout condition through the inter-node read timer 122 provided in the inter-node read failure detection circuit 120 of the system controller 111 of the own node. A certain fixed value (with all bits set to "1" and an ECC code that does not entail error detection) is returned to the processor of the node 200.

(14) Since the value of the status flag (FLG) for the node 100 obtained by the remote read is 0×FF (i.e., the value with all bits set to "1" generated by the inter-node read failure detection circuit 120 in (13)), the cluster driver of the node 200 detects a failure in inter-node data transfer and aborts the transfer process. The processor itself, however, operates normally without detecting any error.

(15) The cluster driver of the node 200 disconnects the communications link with the node 100.

(Embodiment 2)

Figure 4:
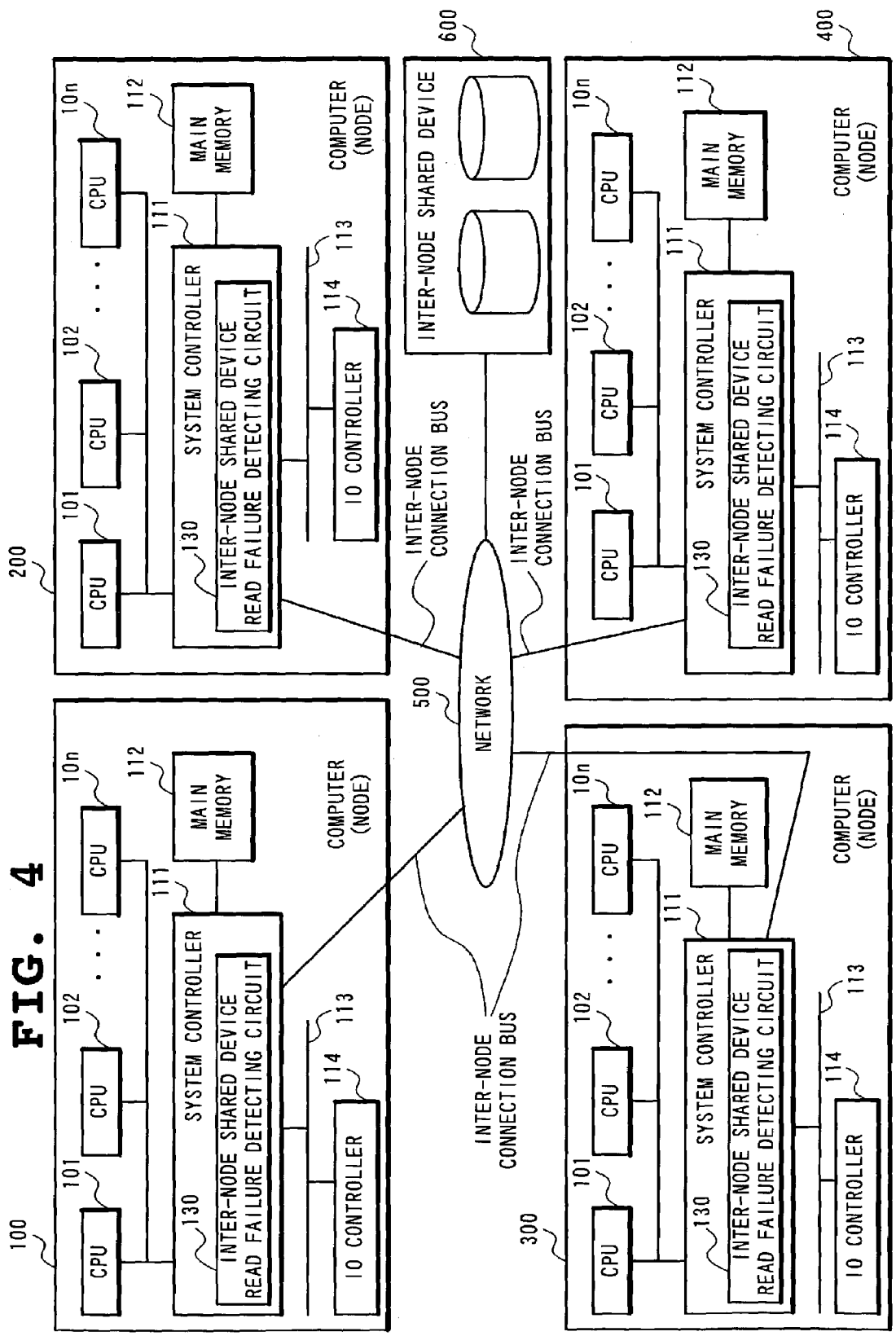
FIG. 4 is a block diagram showing a typical configuration of a computer system according to the second embodiment of the present invention.
Figure 5:
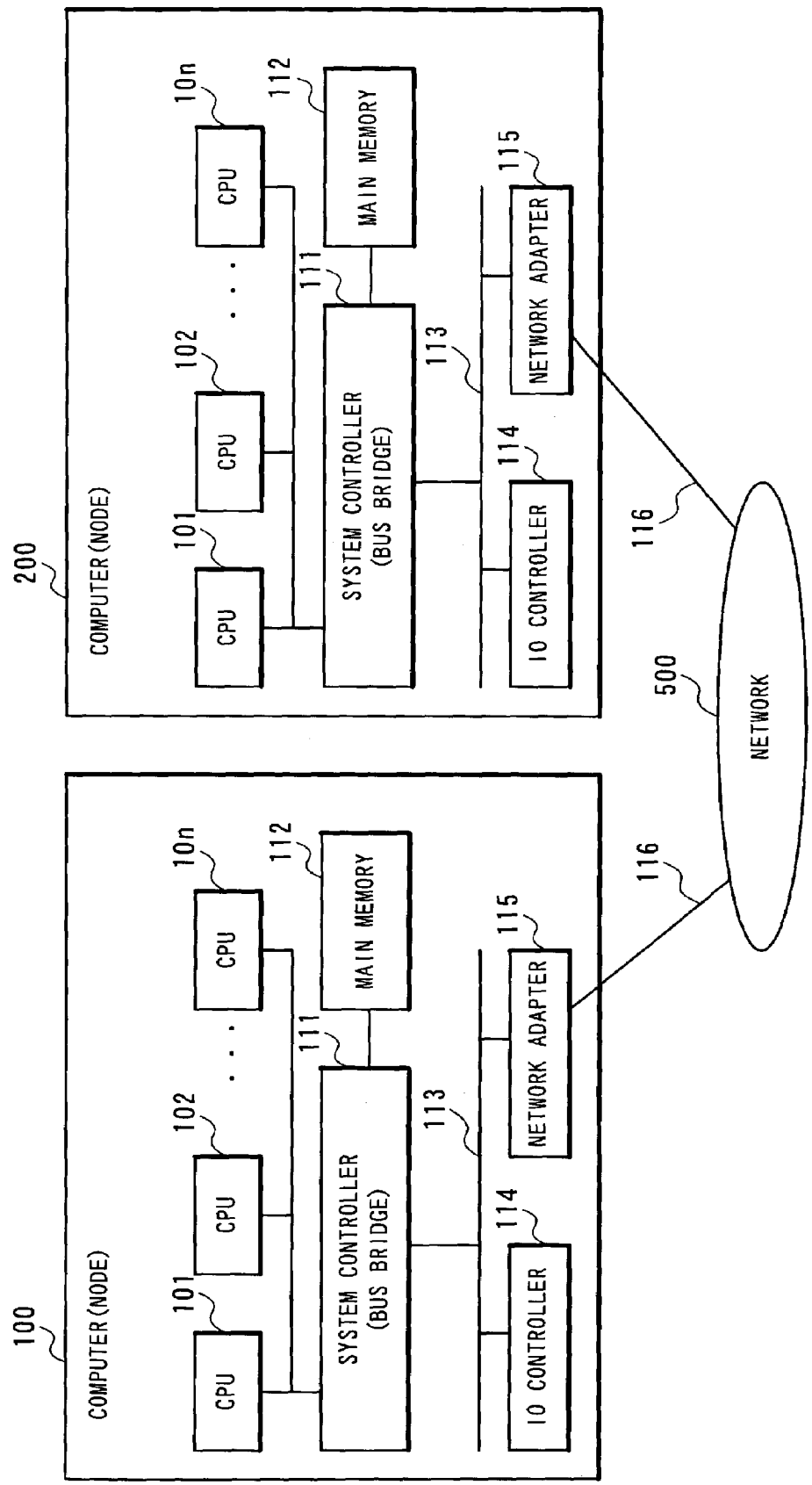
FIG. 5 is a block diagram showing a typical configuration of a conventional computer system.
Figure 6:
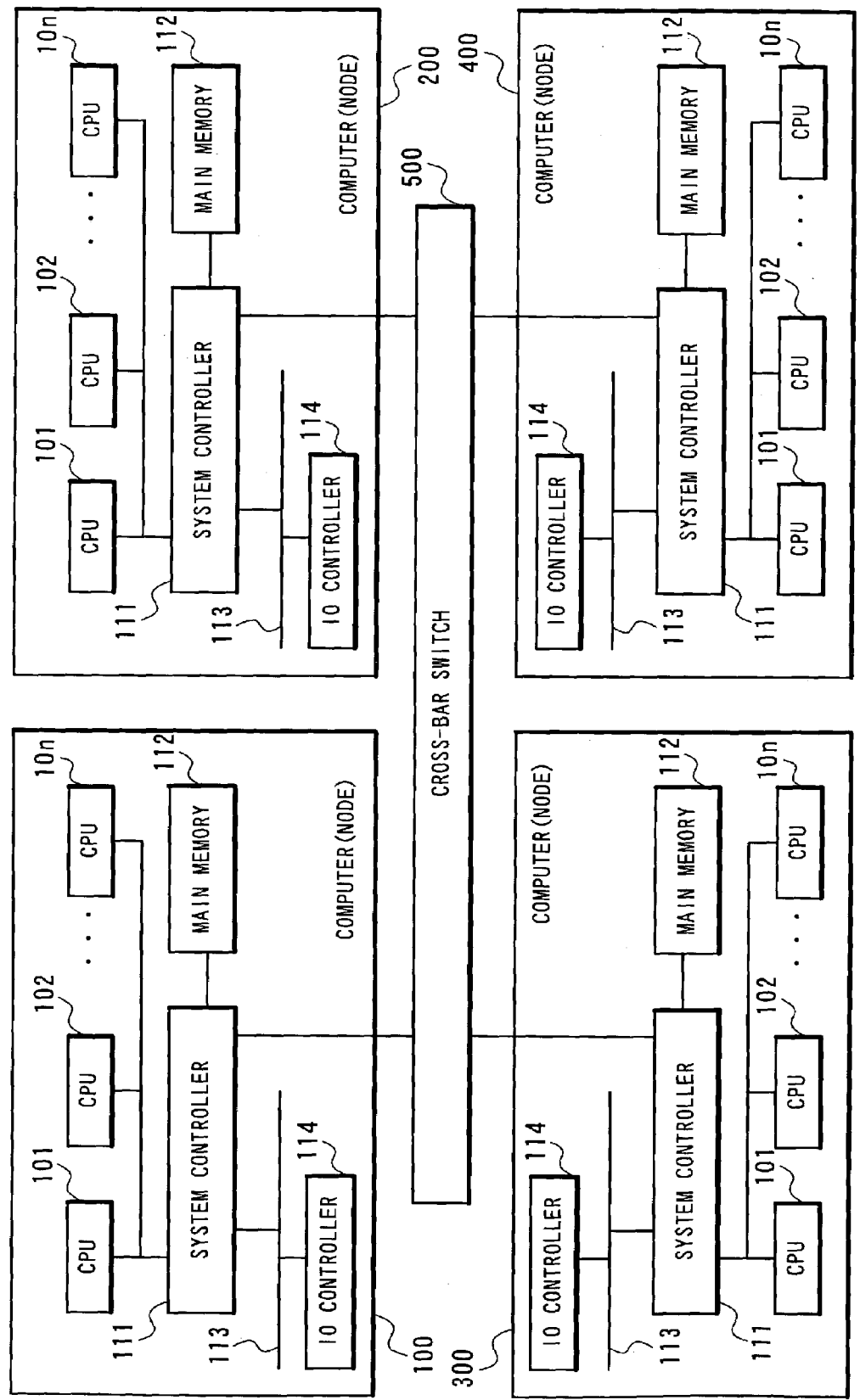
FIG. 6 is a block diagram showing a typical configuration of a conventional computer system.

FIG. 4 is a block diagram showing the configuration of a computer system according to the second embodiment of the present invention.

A typical cluster system has a configuration, in which a plurality of nodes 100 to 400 comprising the cluster system are connected, through a network 500 or the like, to an inter-node shared device 600 for common use by the nodes 100 to 400 and in which the individual nodes 100 to 400 controls registers or physical memories in the inter-node shared device 600 by performing read or write operations. In such a cluster system, if a read from a register in the inter-node shared device 600 has been issued by each of the nodes 100 to 400 but a failure occurs in the inter-node shared device 600 before the read is responded, the processors of the nodes 100 to 400 will time out or be stalled, possibly causing the plurality of nodes 100 to 400 in the cluster system to go down.

In order to prevent this problem, the present invention provides each of the nodes 100 to 400 with special node driver software to control the software inter-node shared device 600. In addition, when the system controller 111 of each of the nodes 100 to 400 issues a read for the inter-node shared device 600, it first registers the read in the read failure detection circuit 130 of the inter-node shared device. If a failure occurs in the inter-node shared device 600, the read failure detection circuit 130 of the inter-node shared device returns a certain fixed value as a reply data to the processor. Upon reading the fixed value returned by the read failure detection circuit 130 of the inter-node shared device, the driver software determines that the shared device has failed and stops using the shared device.

As is clear from the foregoing, even if no reply data is returned due to a failure that has occurred in a source computer (node) or the like from for data transfer, the present invention can prevent a failure from occurring in a target node for data transfer as a result of a processor timeout or stall.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A computer system in which a plurality of computers, each including a plurality of processors, are connected to each other, said computer system comprising:

a system controller in each said computer for, at a time of a failure within the computer system, disconnecting its own computer from another computer in which said failure has occurred, without informing said its own processors of such failure, wherein said system controller includes an inter-computer read failure detector, and wherein the inter-computer read failure detector comprises:

an inter-computer read register registering an identification of an inter-computer read issued by the system controller for any of the computers;

an inter-computer read timer measuring an elapse of a pre-specified period of time from when an inter-computer read is issued;

a dummy data reply generator for, after a timeout condition upon the elapse of the pre-determined period of time, generating a pre-defined fixed value for the computer issuing an inter-computer read for use as a temporary reply to the read; and a dummy reply timeout setting register for registering a time elapsed before the temporary reply to the read is returned.

2. The computer system as set forth in claim 1, wherein the inter-computer read failure detector further comprises:
an inter-computer reply detector detecting that a read reply data has been returned successfully from any of the computers and instructing the inter-computer read register to remove the registration; and
a selector for outputting selectively, one of the read reply data from any of the computers and the temporary reply to the read data, to the computer issuing the inter-computer read.

3. The computer system as set forth in claim 1, wherein said system controller is placed subordinate to said each computer.

4. The computer system as set forth in claim 1, wherein said each computer comprises a main memory accessible by said plurality of processors.

5. The computer system as set forth in claim 1, wherein said system controller is placed subordinate to said each computer, and wherein said each computer comprises a main memory accessible by said plurality of processors.

6. The computer system as set forth in claim 1, wherein said each computer comprises a cluster driver for transferring data one of received and transmitted between said its own processors and processors of said other computer.

7. The computer system as set forth in claim 1, wherein said system controller is placed subordinate to said each computer, said each computer comprising a cluster driver for transferring data one of received and transmitted between said its own processors and processors of said other computer.

8. The computer system as set forth in claim 1, wherein said system controller is placed subordinate to said each computer, said each computer comprising:
a main memory accessible from said plurality of processors; and
a cluster driver for transferring data one of received and transmitted between said its own processors and processors of said other computer.

9. The computer system as set forth in claim 1, wherein said system controller comprises:
means for transmitting a signal to said other computer if there is no reply from said other computer to data that said its own processors has transferred to a processor of said other computer; and
means for disconnecting said its own processors from said other computer if there is no reply to said signal within a pre-specified period of time.

10. The computer system as set forth in claim 9, wherein said system controller comprising a timer for measuring said specified period of time.

11. The computer system as set forth in claim 1, wherein said system controller is placed subordinate to said each computer, said system controller comprising:
means for transmitting a signal to said other computer if there is no reply from said other computer to data that said its own processors has transferred to a processor of said other computer; and
means for disconnecting said its own processors from said other computer if there is no reply to said signal within a pre-specified period of time.

12. The computer system as set forth in claim 1, wherein said each computer comprises:
main memory accessible by said plurality of processors; and wherein said system controller comprises:
means for transmitting a signal to said other computer if there is no reply from said other computer to data that said its own processors has transferred to a processor of said other computer; and
means for disconnecting said its own processors from said other computer if there is no reply to said signal within a pre-specified period of time.

13. The computer system as set forth in claim 1, wherein said system controller is placed subordinate to said each computer, said each computer comprising:
a cluster driver for transferring data one of received and transmitted between said its own processors and a processor of said other computer; and
wherein said system controller further comprises:
means for transmitting a signal to said other computer if there is no reply from said other computer to data that said its own processors have transferred to a processor of said other computer; and
means for disconnecting said its own processors from said other computer if there is no reply to said signal within a pre-specified period of time.

14. The computer system as set forth in claim 1, wherein said system controller is placed subordinate to said each computer,
said each computer comprising:
a main memory accessible by said plurality of processors; and
wherein said system controller comprises:
means for transmitting a signal to said other computer if there is no reply from said other computer to data that said its own processors has transferred to a processor of said other computer; and
means for disconnecting said its own processors from said other computer if there is no reply to said signal within a pre-specified period of time.

15. The computer system as set forth in claim 1, wherein said each computer comprises:
a cluster driver for transferring data one of received and transmitted between said its own processors and a processor of said other computer; and
wherein said system controller comprises:
means for transmitting a signal to said other computer if there is no reply from said other computer to data that said its own processors has transferred to a processor of said other computer; and
means for disconnecting said its own processors from said other computer if there is no reply to said signal within a pre-specified period of time.

16. The computer system as set forth in claim 1, wherein said system controller is placed subordinate to said each computer, said each computer comprising:
a main memory accessible from said plurality of processors; and
a cluster driver for transferring data one of received and transmitted between said its own processors and a processor of said other computer, and
wherein said system controller comprises:
means for transmitting a signal to said other computer if there is no reply from said other computer to data that said its own processors have transferred to a processor of such other computer; and
means for disconnecting said its own processors from said other computer if there is no reply to said signal within a pre-specified period of time.

17. A computer system in which computers, each including a plurality of processors, are connected to each other, said computer system comprising:

in each computer, a system controller for, at a time of a failure within the computer system, disconnecting its own computer from another computer in which said failure has occurred, without informing its own processors of such failure, thereby allowing said its own processors to continue processing, wherein said system controller includes an inter-computer read failure detection means for detecting read failures between computers, the inter-computer read failure detection means comprising:

an inter-computer read registering means for registering an identification of an inter-computer read issued by the system controller;

an inter-computer read timer means for measuring an elapse of a pre-specified period of time from when an inter-computer read is issued;

a dummy data reply generating means for, after a timeout condition upon the elapse of the pre-determined period of time, generating a pre-defined fixed value for the computer issuing an inter-computer read for use as a temporary reply to the read;

a dummy reply timeout setting register means for registering a time elapsed before the temporary reply to the read is returned;

an inter-computer reply detection means for detecting that a read reply data has been returned successfully from any of the computers and instructing the inter-computer read registering means to remove the registration; and a selector means for outputting selectively, one of the read reply data from any of the computers and the temporary reply to the read data, to the computer issuing the inter-computer read.

* * * * *